United States Patent [19]

Conforti

[11] Patent Number: 4,713,793

[45] Date of Patent: Dec. 15, 1987

[54] CIRCUIT FOR CCIS DATA TRANSFER BETWEEN A CPU AND A PLURALITY OF TERMINAL EQUIPMENT CONTROLLERS

[75] Inventor: Joseph A. Conforti, Phoenix, Ariz.

[73] Assignee: GTE Communication Systems Corporation, Phoenix, Ariz.

[21] Appl. No.: 803,694

[22] Filed: Dec. 2, 1985

[51] Int. Cl.[4] .............................................. G06F 9/00
[52] U.S. Cl. .................................................... 364/900
[58] Field of Search .................. 364/200, 900; 370/85, 370/110.1, 58; 379/230

[56] References Cited

U.S. PATENT DOCUMENTS

| | | | |
|---|---|---|---|
| 4,003,033 | 1/1977 | O'Keefe et al. | 364/200 |
| 4,156,277 | 5/1979 | Seitz et al. | 364/200 |
| 4,303,990 | 12/1981 | Seipp | 364/900 |
| 4,466,062 | 8/1984 | Krikor | 364/200 |
| 4,628,505 | 12/1986 | Paris | 370/85 |

Primary Examiner—Gareth D. Shaw
Assistant Examiner—John G. Mills
Attorney, Agent, or Firm—Frank J. Bogacz; Peter Xiahros

[57] ABSTRACT

Simplified CCIS (Common Channel Interoffice Signalling) data transfer circuitry is shown for transmitting data between a CCIS central processing unit of a central switching office and a number of terminal equipment controllers, each having a local CPU. The terminal equipment controller operates such equipment as modems of various speed, digital trunks or T1 spans. This design minimizes the amount of circuitry required to transmit CCIS data between central processing units, thereby permitting a more reliable design. This circuit provides a minimal amount of logic required for interprocessor communication. In addition, this circuit minimizes the amount of real time required by each CPU to perform the CCIS data transfer.

14 Claims, 2 Drawing Figures

CIRCUIT FOR CCIS DATA TRANSFER BETWEEN A CPU AND A PLURALITY OF TERMINAL EQUIPMENT CONTROLLERS

CROSS-REFERENCE TO RELATED APPLICATIONS

The present application is related to U.S. patent application Ser. No. 412,617, now U.S. Pat. No. 4,466,062, which is assigned to the same assignee and has the same inventive entity as the present application.

BACKGROUND OF THE INVENTION

The present invention pertains to CCIS (Common Channel Interoffice Signaling) data transfer between a CCIS central processing unit and a plurality of terminal equipment controllers and more particularly to direct memory transfer between the CCIS central processing unit and each terminal equipment controller.

Data transfer between a control CPU and a number of terminal equipment controller is typically accomplished via a buffering arrangement. Each terminal equipment controller typically has a buffer into which it places data. The buffer of each terminal equipment controller is then scanned by the control CPU to determine whether any data has been received. In addition, the control CPU also scans its own memory to determine whether any CCIS data is to be transmitted to a particular terminal equipment controller's buffer. If any such CCIS data is present, the control CPU transmits this data to the buffer.

These buffers are bi-directional devices which are capable of communicating with both the CCIS control central processing unit and a local processor of the terminal equipment controller. As a result, interface logic is required to inhibit simultaneous access to the buffer by both CPUs. This logic must perform an interlocking function between the two central processing units and the common buffer. This interlocking functions creates an increase in the number of components required to implement the design. The increase in components produces a corresponding increase in the number of potential failures. One such system is taught by U.S. Pat. No. 4,466,062, issued on Aug. 14, 1984 to K. Krikor. The Assignee of the present Application is the successor of all rights, title and interest of the above mentioned patent.

Accordingly, it is an object of the present invention to provide a streamlined CCIS data transfer circuit for transferring data between a CCIS central processing unit and a number of terminal equipment controllers to minimize the amount of failure prone components.

SUMMARY OF THE INVENTION

In a CCIS system a circuit controls the direct data transfer between an active CPU of a duplex pair of CPUs and a number of terminal equipment controllers. This circuit includes first and second CPU buses, each connected to the active CPU. The data transfer circuit also includes first and second multiplexers which correspond to the first and second CPU buses. Each of the multiplexers is connected to the active CPU via the corresponding first and second CPU buses. The first multiplexer is also connected to a first plurality of the terminal equipment controllers. The second multiplexer is connected to a second plurality of the terminal equipment controllers. The multiplexers are each operated in response to the active CPU to connect the active CPU to each of the terminal equipment controllers to which the multiplexer is connected.

The data transfer circuitry also includes circuitry in each of the terminal equipment controllers: a local CPU, memory, a local bus, a requesting circuit and a bus controller.

The local CPU and memory are connected by the local bus. The local bus operates to transmit an address of the local CPU to the memory for transmitting data from the local CPU to the memory or for transmitting data from the memory to the local CPU.

The requesting circuit is connected to the active CPU via the corresponding multiplexer and is connected to the local CPU. The requesting circuit operates in response to a select signal of the active CPU to produce a request signal for transmission to the local CPU. The local CPU operates in response to the request signal to disconnect or tri-state itself from the local bus. The local CPU also operates in response to the request signal to produce an acknowledge signal.

The bus controller is connected to the local CPU, to the local bus and to first and second CPU buses via the corresponding multiplexer. The bus controller operates in response to the acknowledge signal of the CPU to connect the first or the second CPU bus to the local bus for the direct transfer of CCIS data to the memory.

A BRIEF DESCRIPTION OF THE DRAWINGS

DESCRIPTION OF THE PREFERRED EMBODIMENT

Figure 1:
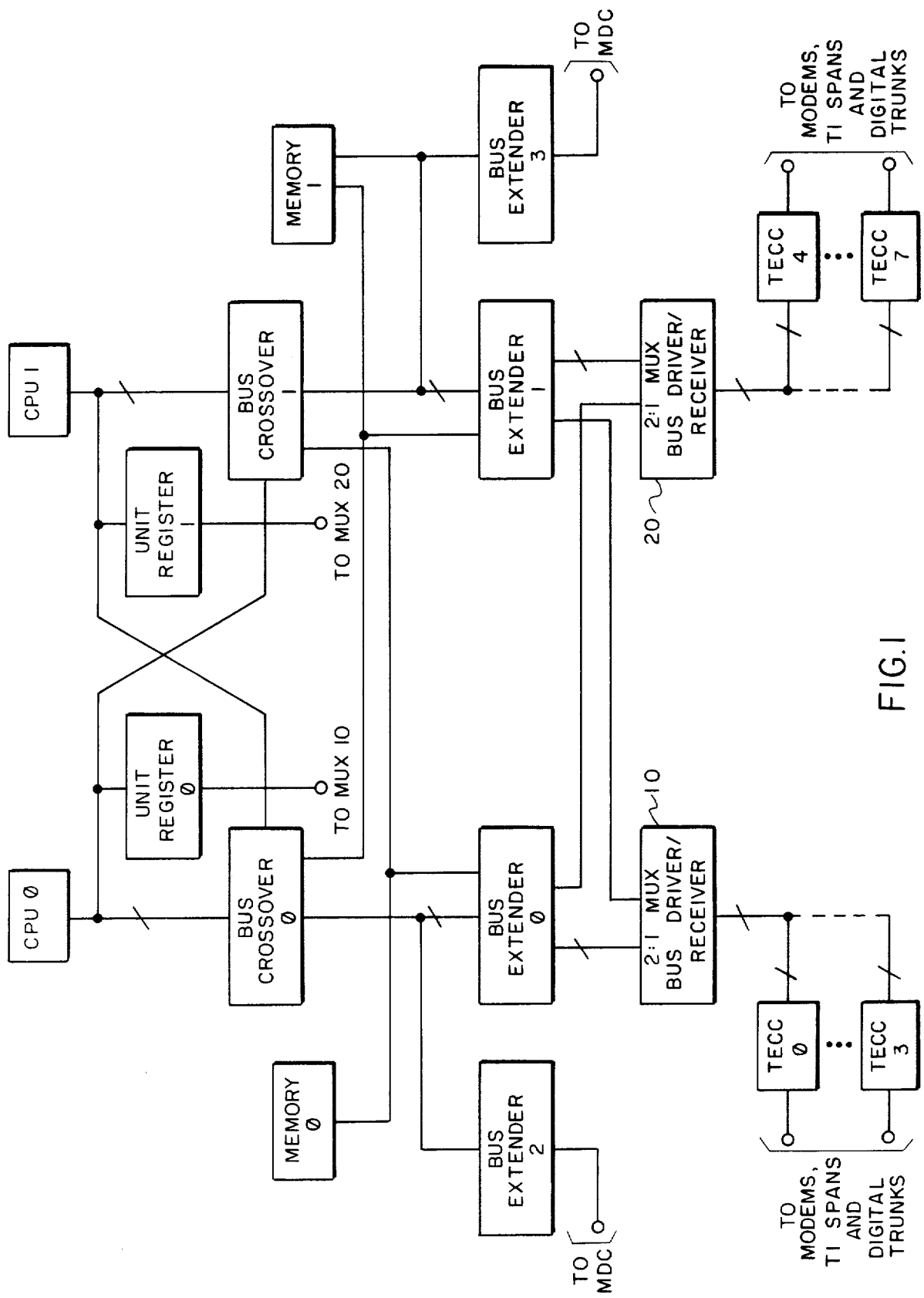
FIG. 1 is a block diagram of a Common Channel Interoffice Signaling system.

Referring to FIG. 1, a CCIS data link sub-system of a central switching office is shown. The control circuitry of the data link sub-system includes two Intel 8086 microprocessors, CPU0 and CPU1. Intel is a registered trademark of the Intel Corporation. Only one of these processors is active at a particular time. The other processor is a backup processor which operates upon detection of a fault in the active processor. The backup processor is a "hot" standby processor which runs self-diagnostics until such time as it becomes active and the other becomes standby.

Each CPU functions to collect data received or transmitted to or from analog and digital sources, such as modems and T1 spans or digital trunk units. This data is collected and analyzed and retransmitted to another processor group. CPU0 and 1 are respectively connected to the bus extender units 0 and 1, which function to provide for a multiplicity of connections to each CPU's address and data buses. Connected between each CPU and bus extender is a corresponding bus cross-over network which provides the ability to operate circuitry of one portion of the CCIS sub-system with the CPU of the opposite portion of the sub-system. For example, bus extender 0 may be operated by CPU1. In addition, each CPU has a corresponding memory connected via the bus cross-over circuit. This memory contains the instruction and data stores necessary to operate each CPU for data collection, analysis and transfer.

Each bus extender circuit is connected to two multiplexer units 10 and 20. Each multiplexer unit may handle up to four sources of digital or analog information input. The two multiplexing units 10 and 20 may be operated by either CPU. Each CPU may handle a total of eight sources of data input/output.

CPU0 and CPU1 are respectively connected to unit register 0 and 1. Unit registers 0 and 1 are connected to multiplexers 10 and 20 respectively. The unit registers are operated under the CPU's instructions to select which particular transmission source is connected to multiplexers 10 and 20 for the collection or transmission of data by the corresponding CPU.

Each source is connected to the CPUs through its corresponding multiplexer by a terminal equipment control circuit (TECC 0-3, 4-7). The TECCs serve to control the particular data terminal equipment device such as a modem (analog 2400 bits per second or digital 4000 bits per second) and may be implemented with an Intel 8085 microprocessor and associated logic.

FIG. 1 represents a CCIS configuration for a particular telephone central office. CCIS data includes trunk signaling and supervision data from voice trunks. Instead of transmitting this data in a conventional manner over the trunk itself, the signaling data is sent via a data link arrangement between two CCIS telephone central offices. This results in more efficient use of the trunks than otherwise would be possible. Each CCIS sub-system may both transmit and receive data from another CCIS sub-system of another central office.

Two groups of terminal equipment control circuits (TECCs) are shown in FIG. 1. A first group of 4 terminal equipment control circuits (TECC0-TECC3) is connected between 2 to 1 multiplexer bus driver/receiver 10 and the terminal equipment such as modems, T1 spans and digital trunks. A second group of terminal equipment control circuits TECC4-TECC7 is connected between another set of terminal equipment and 2 to 1 multiplexer bus driver/receiver 20. Each TECC operates to control its corresponding terminal equipment and each TECC includes a processor and associated memory. This processor may include a CPU such as an Intel 8085 microprocessor.

The CPU of each TECC may be programmed to operate modems in an analog mode of transmission at various rates between 110 and 2400 bits per second. This CPU may also operate T1 spans and digital trunks by performing such functions as error detection, error correction, synchronization, recovery and diagnostic functions, reformatting and prioritizing of CCIS data.

When the active CPU (CPU0 or CPU1) of the CCIS sub-system determines that incoming CCIS data has been received by a TECC or that outgoing CCIS data is to be transmitted to a particular TECC, data is transmitted or received directly between the active CPU and a particular TECC with its CPU and associated memory. The active CPU will directly read or write the memory of the particular TECC. The read or write corresponds to receiving or transmitting CCIS data from or to the connected TECC.

Since no intermediate buffering exists, the data transfer arrangement between the active CPU and the particular TECC's CPU is much more reliable. In addition, less components dictates the need for less diagnostic system software. In addition, the direct reading and writing of the TECC's memory eliminates the need for any intermediate buffering and the associated CPUs' real time overhead. As a result, the real time operation of both processors are improved. Due to the direct data transfer between CPUs and despite other switching system limitations, the TECCs may operate the corresponding terminal equipment at nearly a 100 per cent duty cycle.

Figure 2:
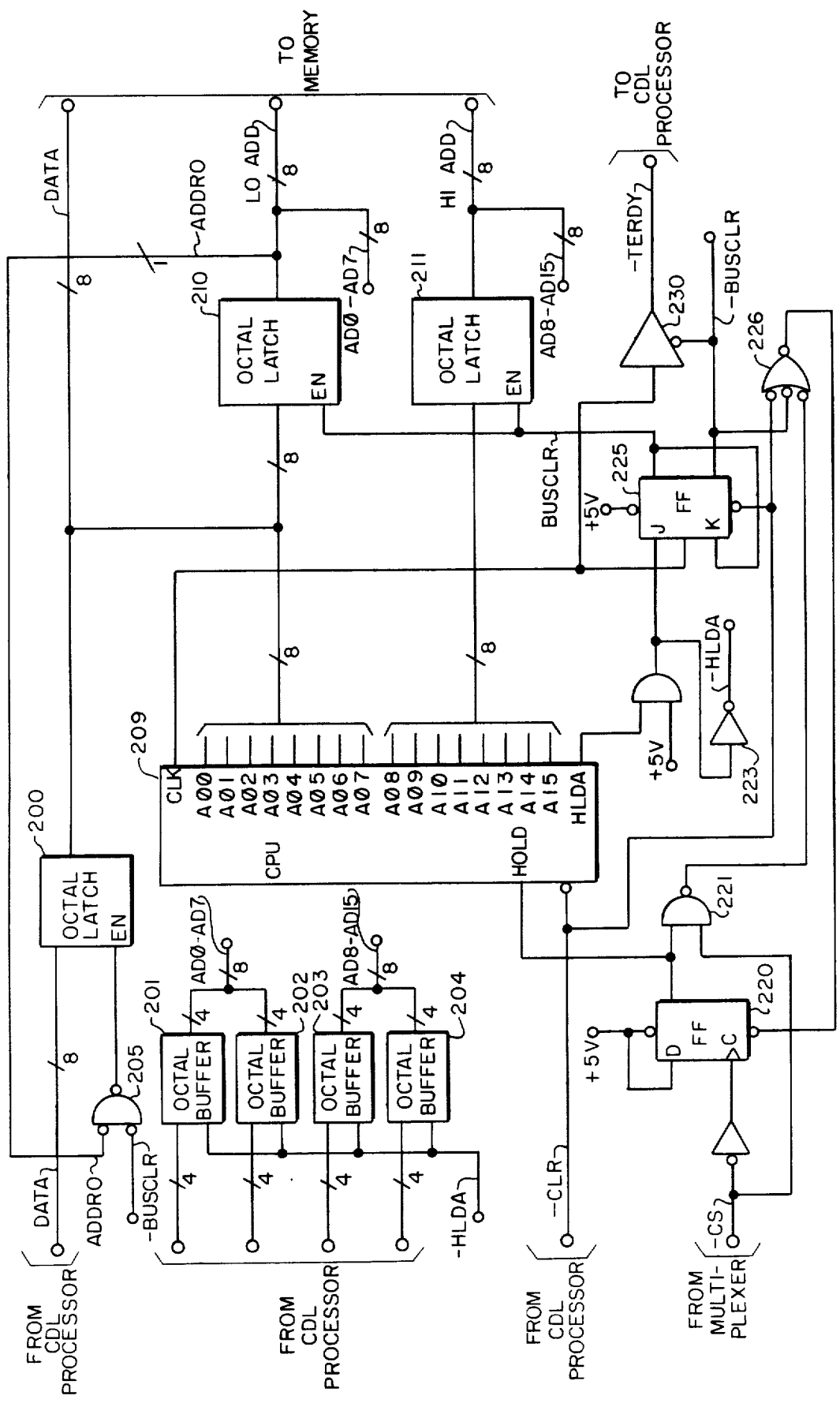
FIG. 2 is a schematic diagram of the terminal equipment control circuit embodying the principles of operation of the present invention.

Referring to FIG. 2, a portion of the CPU/Memory Access and bus structure of a particular TECC is shown. The control processors of the data link sub-system are CPU0 and CPU1 which are called the control data link processors or more simply the CDL processors. For normal operation of one such TECC, the TECC's CPU 209 reads program instructions from a memory (not shown) and writes data and reads data from the memory. CPU 209 outputs a 16-bit address to accessing a memory location. The lower byte of this address (address bits A00 through A07 are transmitted via an 8-bit bus and latched by OCTAL latch 210. The high byte of the CPU address (address bits A08 through A15 are transmitted via another 8-bit bus and latched by OCTAL latch 211. When CPU 209 outputs the proper read or write signal (not shown) the memory is written to read from. The data received from the memory or transmitted to the memory is via an 8-bit DATA bus. This is connected from CPU 209 to the memory and is the same 8-bit bus upon which the low byte of the address is output. The data word appears on the combined bus at a later time and is multiplexed with the low order byte of the address.

For the rapid transmission of data between the CDL processor (CPU0 or CPU1) and the TECC, the data bus of the CDL is connected to the data bus of the TECC via OCTAL latch 200. The address bus of the CDL processor is 16-bits wide. The low order nibble (4 bits) of the CDL address bus is connected to OCTAL buffer 201. The next nibble of the CDL address bus is connected to OCTAL buffer 202. The third and fourth nibbles of the CDL address bus are connected to OCTAL buffers 203 and 204 respectively. The output of OCTAL buffers 201 and 202 are combined into an 8-bit bus (AD0-AD7) and the high byte of the CDL address is comprised by the outputs of OCTAL buffers 203 and 204 as an 8-bit address bus (AD8-AD15). Each of the OCTAL buffers 201 through 204 is connected to inverter 223 via the −HLDA lead. Each of the OCTAL buffers 201 through 204 are controlled by the −HLDA signal to be enabled to go from a tri-state condition (off the bus) to a logic 0 or 1 condition (on the bus).

Eight-bit address bus, AD0-AD7, is connected to the memory via 8-bit bus LOADD. The high byte of the CDL address bus, AD8-AD15, is connected to memory via the HIADD address bus.

The −CLR lead connects the CDL processor to CPU 209 and to NOR gate 226. The CDL processor signals on this clear lead for the TECC processor and associated circuitry to reset.

When the CDL processor needs to transmit or receive data from the TECC, the CDL selects a particular TECC and causes the −CS lead to become active low. All TECC's are connected to either multiplexers 10 or 20 via a unique −CS lead. The −CS lead is connected to the clock input of flip-flop 220 and to NAND gate 221. D-type flip-flop 220 latches and stores the CS signal to indicate that the CDL has selected this particular TECC for data transfer. The output of flip-flop 220 is connected to the HOLD input of CPU 209 and to NAND gate 221. The HOLD signal instructs CPU 209 to complete its present cycle, but to suspend operation and tri-state its buses before any further operation by CPU 209.

NAND gate 221 has its output connected to NOR gate 226. NAND gate 221 protects against any transient signal on the −CS lead being detected as a true signal. If the −CS lead has a transient signal, flip-flop 220 will latch a logic 1 on its output. At the next clock cycle, the −CS lead will not be active. This will cause NAND gate 221 to go low which will operate NOR gate 226. The output of NOR gate 226 is connected to the clear input of flip-flop 220 and will reset flip-flop 220.

At the next cycle of CPU 209, a HOLD acknowledge signal will be produced on the HLDA lead. The HLDA lead is connected to flip-flop 225 and to inverter 223. J-K flip-flop 225 will latch the HOLD acknowledge signal. Flip-flop 225 will produce the bus clear signal on the BUSCLR lead, which is connected to the enable input of OCTAL latches 210 and 211. OCTAL latches 210 and 211 will operate in response to the bus clear signal to go to the tri-state condition and disable their outputs from the LOADD and HIADD address buses respectively.

Simultaneously with the transmission of the bus clear signal, the HOLD acknowledge signal will be transmitted from inverter 223 to the enable input of OCTAL buffers 201 through 204 via the −HLDA lead. The HOLD acknowledge signal will enable OCTAL buffers 201 through 204 onto the memory address bus (LOADD and HIADD). As a result, the address on the memory address bus is now the CDL processor's address. CPU 209 has had its address and data buses tri-stated (high impedance) or removed from the bus.

The clock output lead (CLK) of CPU 209 is connected to the clock input of J-K flip-flop 225 and to the input of tri-state device 230. The CLK signal clock J-K flip-flop 225 to produce the bus clear signal on the BUSCLR lead. The bus clear signal enables or disables OCTAL latches 210 and 211 from the memory address bus LOADD and HIADD. The opposite sense of the bus clear signal is transmitted via the −BUSCLR lead from flip-flop 225 to the enable input of tri-state device 230. The terminal equipment ready signal, which is the output of tri-state device 230, is transmitted to the CDL processor via the −TERDY lead and the connected multiplexer. The terminal equipment ready signal indicates to the CDL processor that the CDL's memory access to the particular TECC is complete.

Flip-flop 225 is connected to NAND gate 205 via the −BUSCLR lead. The low order address bit of the memory address bus (ADDRO) is connected to another input of NAND gate 205. The output of NAND gate 205 is connected to the enable lead of OCTAL latch 200.

When the active CDL processor requires a data transfer with a particular TECC, the particular TECC's −CS lead or card select is made active by the CDL processor via a connection from the multiplexer. The card select signal is sensed by flip-flop 220. The latched output of flip-flop 220 is transmitted to the HOLD input of CPU 209. The latched value of flip-flop 220 is compared with the card select lead by NAND gate 221. If a spurious signal is present on the card select lead, NOR gate 226 will reset flip-flop 220, thereby removing the hold request from CPU 209.

At the completion of its next cycle, CPU 209 will produce the HOLD acknowledge signal on the HLDA lead. This signal will be latched by flip-flop 225 and its output is the bus clear signal. The HOLD acknowledge signal will cause OCTAL buffers 201 through 204 to latch the CDL processor's address for memory transfer. The HOLD acknowledge signal will also enable OCTAL buffers 201 through 204 to place their outputs onto the memory address bus (LOADD and HIADD). Simultaneously, the bus clear signal will cause OCTAL latches 210 and 211 to tri-state their outputs and thereby remove the CPU 209 address from the memory address bus.

As the CDL's address is placed on the memory address bus by OCTAL buffers 201 through 204, the low order address bit ADDRO will be combined with the bus clear signal to enable OCTAL latch 200 to either latch the data being sent by the CDL processor or to latch the data being received from the memory for transmission to the CDL processor. The bus clear signal will enable tri-state device 230 to transmit the CLK signal of CPU 209 back to the CDL processor via the −TERDY lead. This will signal the CDL processor that it may remove the data from OCTAL latch 200 or that the data has been written into memory.

Since the HOLD acknowledge output of CPU 209 goes low on the next clock signal on the CLK lead, flip-flop 225 will reset on the next CLK signal and thereby cause the bus clear signals to go to the opposite logic value. As a result, tri-state device 230 will be tri-stated (off the CDL's bus). In addition, NOR gate 226 will be activated to reset flip-flop 220, thereby removing the hold request from CPU 209 and allowing CPU 209 to resume it processing. In addition, the logic value change of the bus clear signal will cause OCTAL latches 210 and 211 to be placed back on the memory bus LOADD and HIADD respectively. The new value of the bus clear signal will cause OCTAL latch 200 to be tri-stated and thereby removed the CD processor from the memory data bus. The inactive HOLD acknowledge signal will also cause OCTAL buffers 201 through 204 to be tri-stated, thereby removing the CDL processor's address bus AD0-AD7 and AD8-AD15 from the memory address bus LOADD and HIADD. As a result, the TECC processor CPU 209 is placed back in control of the data and address buses of the memory.

OCTAL latches 200, 210 and 211 maybe implemented with OCTAL transceivers integrated circuit part number 74LS245. OCTAL buffers 201 through 204 may each be implemented with quad buffers integrated circuit part number 74LS244.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a Common Channel Interoffice Signalling (CCIS) system, a circuit for direct CCIS data transfer between an active CPU of a duplex pair of CPUs and a plurality of terminal equipment controllers, said circuit comprising:

first and second multiplexer means, each corresponding to said first and second CPU bus means, each said multiplexer means being connected to said active CPU via said corresponding first and second CPU bus means and said first multiplexer means being connected to a first plurality of said terminal equipment controllers and said second multiplexer means being connected to a second plurality of said terminal equipment controllers, each said multiplexer means being operated in response to said active CPU to connect said active CPU to each of said connected terminal equipment controllers;

each said terminal equipment controller including:

local CPU means;

memory means;

local bus means connected to said local CPU means and to said memory means, said local bus means being operated to transmit an address to said memory means and to transmit data from said local CPU means to said memory means and to transmit data from said memory means to said local CPU means;

requesting means connected to said active CPU via said corresponding multiplexer means and connected to said local CPU means, said requesting means being operated in response to a select signal transmitted from said active CPU to produce a request signal for transmission to said local CPU means;

said local CPU means being operated in response to said request signal to disconnect itself from said local bus means and to produce an acknowledge signal;

bus control means connected to said local CPU means, to said local bus means and to said first and second CPU bus means via said corresponding multiplexer means, said bus control means being operated in response to a first value of said acknowledge signal to connect said first CPU bus means to said local bus means for said direct CCIS data transmission to said memory means and said bus control means being operated in response to a second value of said acknowledge signal to connect said second CPU bus means to said local bus means for said direct CCIS data transmission to said memory means.

2. A circuit for direct Common Channel Interoffice Signalling (CCIS) data transfer as claimed in claim 1, said requesting means including:

detecting means connected to said corresponding multiplexer means and to said local CPU means, said means for detecting being operated in response to said select signal to store a select signal of a first value and being further operated in response to a second value of said select signal to produce a first signal; and resetting means connected to said detecting means and being operated in response to said first signal to reset said detecting means.

3. A circuit for direct Common Channel Interoffice Signalling (CCIS) data transfer as claimed in claim 2, said detecting means including:

first latching means connected to said local CPU means and to said corresponding multiplexer means said first latching means for storing said select signal; and first gating means connected to said corresponding multiplexer means and to said first latching means, said first gating means being operated to produce said first signal.

4. A circuit for direct Common Channel Interoffice Signalling (CCIS) data transfer as claimed in claim 3, said resetting means including second gating means connected to said first gating means and to said first latching means, said second gating means being operated in response to said first signal to reset said first latching means.

5. A circuit for direct Common Channel Interoffice Signalling (CCIS) data transfer as claimed in claim 4, said bus control means including:

second latching means connected to said local CPU means and to said second gating means, said second latching means being operated to produce a bus clear signal;

inverting means connected to said local CPU means via said acknowledge lead and being operated to invert said acknowledge signal; and enabling means connected to said second latching means, to said inverting means, to said local bus means and to said first and second CPU bus means via said corresponding multiplexer means, said enabling means being operated in response to said second latching means and to said inverting means to connect said first and second CPU bus means to said local bus means.

6. A circuit for direct Common Channel Interoffice Signalling (CCIS) data transfer as claimed in claim 5, wherein there is further included third gating means connected to said second latching means and to said local CPU means via a clock lead and to said active processor via said corresponding multiplexer means, said third gating means being operated in response to said bus clear signal of said second latching means to transmit a ready signal to said active CPU, indicating that said CCIS data transfer has been completed.

7. A circuit for direct Common Channel Interoffice Signalling (CCIS) data transfer as claimed in claim 6, said enabling means including first tri-state means connected to said memory, to said local CPU means via an address bus and to said second latching means, said first tri-state means being operated in response to said bus clear signal to disconnect said address bus from said local bus means.

8. A circuit for direct Common Channel Interoffice Signalling (CCIS) data transfer as claimed in claim 7, said enabling means further including, second tri-state means connected to said inverting means, to said local bus means and to an address portion of said first and second CPU bus means, said second tri-state means being operated in response to said inverted acknowledge signal to enable said address portion of said first and second CPU bus means to be connected to said local bus means.

9. A circuit for direct Common Channel Interoffice Signalling (CCIS) data transfer as claimed in claim 8, wherein there is further included fourth gating means connected to said second latching means and to said local bus means, said fourth gating means being operated to transmit a ready signal to active CPU.

10. A circuit for direct Common Channel Interoffice Signalling (CCIS) data transfer as claimed in claim 9, said enabling means further including third tri-state means connected to said fourth gating means, to said local bus means, and to a data portion of said first and second CPU bus means, said third tri-state means being operated in response to said bus clear signal and to said local bus means to connect said data portion of said first and second CPU bus means to said local bus means for the transmission of data directly between said active CPU and said memory.

11. A circuit for direct Common Channel Interoffice Signalling (CCIS) data transfer as claimed in claim 10, said first tri-state means including a plurality of tri-state OCTAL latches.

12. A circuit for direct Common Channel Interoffice Signalling (CCIS) data transfer as claimed in claim 11, said second tri-state means including a plurality of tri-state OCTAL buffers.

13. A circuit for direct Common Channel Interoffice Signalling (CCIS) data transfer as claimed in claim 1, said duplex pair of CPUs further including:

first and second CPUs;

first and second bus cross-over means, each bus cross-over means connected to each said CPU via said corresponding CPU bus means;

first and second CPU memories connected to each bus cross-over means;

first and second bus extender means connected to each said bus cross-over means and to each said CPU memory; and first and second register means connected respectively between said first and second CPUs and said corresponding multiplexer means, each register means being operated to selectively enable said active CPU to be connected to specific ones of said plurality of terminal equipment controllers for directly transmitting said CCIS data.

14. A circuit for direct Common Channel Interoffice Signalling (CCIS) data transfer as claimed in claim 1, wherein there is further included first and second pluralities of terminal equipment connected to corresponding first and second pluralities of said terminal equipment controllers.

* * * * *